United States Patent
O'Sullivan et al.

(10) Patent No.: US 9,021,074 B2
(45) Date of Patent: Apr. 28, 2015

(54) SYSTEM AND METHOD FOR PROVIDING SERVER STATUS AWARENESS

(75) Inventors: Patrick Joseph O'Sullivan, Dublin (IE); Brian Douglas Gallagher, West Newton, MA (US); Hema Srikanth, Raleigh, NC (US); Robert James Mullin, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 11/937,079

(22) Filed: Nov. 8, 2007

(65) Prior Publication Data

US 2009/0125622 A1   May 14, 2009

(51) Int. Cl.
| | | |
|---|---|---|
| G06F 15/173 | (2006.01) | |
| G06F 15/16 | (2006.01) | |
| G06F 15/177 | (2006.01) | |
| H04L 12/58 | (2006.01) | |
| H04L 29/14 | (2006.01) | |
| H04L 12/24 | (2006.01) | |
| H04L 12/26 | (2006.01) | |
| H04L 29/08 | (2006.01) | |

(52) U.S. Cl.
CPC ............ *H04L 12/5885* (2013.01); *H04L 41/22* (2013.01); *H04L 43/0876* (2013.01); *H04L 67/36* (2013.01); *H04L 12/581* (2013.01); *H04L 51/04* (2013.01); *H04L 51/34* (2013.01); *H04L 67/1008* (2013.01); *H04L 67/22* (2013.01); *H04L 67/306* (2013.01); *H04L 67/1031* (2013.01); *H04L 67/1034* (2013.01); *H04L 67/02* (2013.01); *H04L 67/1002* (2013.01); *H04L 69/40* (2013.01); *H04L 67/1038* (2013.01)

(58) Field of Classification Search
CPC ...... H04L 41/22; H04L 43/0876; H04L 67/36
USPC .............. 709/223, 224, 225; 707/10; 714/48; 715/736
See application file for complete search history.

(56) References Cited

U.S. PATENT DOCUMENTS

| | | | |
|---|---|---|---|
| 6,311,216 B1 * | 10/2001 | Smith et al. .................... | 709/226 |
| 6,859,830 B1 * | 2/2005 | Ronneburg et al. ............ | 709/224 |
| 7,343,529 B1 * | 3/2008 | Klinkner et al. ................ | 714/57 |
| 8,429,431 B2 * | 4/2013 | Malik et al. .................... | 713/300 |
| 2001/0054100 A1 * | 12/2001 | Roche et al. ................... | 709/224 |
| 2003/0097475 A1 * | 5/2003 | York ............................. | 709/246 |
| 2003/0131142 A1 | 7/2003 | Horvitz et al. | |
| 2004/0059704 A1 * | 3/2004 | Hellerstein et al. ............... | 707/1 |
| 2004/0059966 A1 * | 3/2004 | Chan et al. ...................... | 714/48 |
| 2005/0071428 A1 | 3/2005 | Khakoo et al. | |
| 2005/0187912 A1 * | 8/2005 | Matsa et al. ...................... | 707/3 |
| 2005/0213563 A1 * | 9/2005 | Shaffer et al. ................ | 370/352 |
| 2005/0273496 A1 * | 12/2005 | Jean et al. ..................... | 709/206 |
| 2006/0031367 A1 | 2/2006 | Buford et al. | |
| 2007/0156706 A1 * | 7/2007 | Hayes ............................ | 707/10 |
| 2007/0233853 A1 * | 10/2007 | Sarma et al. ................... | 709/224 |
| 2007/0250580 A1 * | 10/2007 | Caspi et al. ................... | 709/206 |
| 2008/0244460 A1 * | 10/2008 | Louch ........................... | 715/856 |
| 2011/0099126 A1 * | 4/2011 | Belani et al. .................. | 705/418 |
| 2014/0015669 A1 * | 1/2014 | Arnold et al. .............. | 340/539.1 |

FOREIGN PATENT DOCUMENTS

WO        WO 02097651 A1 *  12/2002

* cited by examiner

*Primary Examiner* — Aftab Nasir Khan
(74) *Attorney, Agent, or Firm* — Holland & Knight LLP; Brian J. Colandreo, Esq.; Jeffrey T. Placker, Esq.

(57) ABSTRACT

A method including analyzing one or more network interactions of a user. One or more servers associated with the one or more network interaction may be identified. A listing of at least a portion of the one or more servers may be rendered.

8 Claims, 3 Drawing Sheets

SYSTEM AND METHOD FOR PROVIDING SERVER STATUS AWARENESS

TECHNICAL FIELD

This disclosure relates to autonomic processes and, more particularly, to autonomic processes for providing server status awareness.

BACKGROUND

Situations often arise in which a user of an application is frustrated because mission critical applications become unavailable, experience interruptions or are otherwise affected. Users may not know that there is a problem with a server until they try to use it. There is often a solution available, but users may not know what that solution is or how to implement it. Thus, there exists a need for a method of providing server status awareness and solution instructions.

SUMMARY OF THE DISCLOSURE

In a first implementation, a method includes analyzing one or more network interactions of a user. One or more servers associated with the one or more network interaction may be identified. A listing of at least a portion of the one or more servers may be rendered.

One or more of the following features may be included. The one or more network interactions may include one or more of: application usage, database usage, mail server access, and instant messaging server access.

Rendering a listing of at least a portion of the one or more servers may include providing a server group listing in an instant messaging user interface, the server group listing including the at least a portion of the one or more servers. An indicator of a status of the at least a portion of the one or more servers may be provided. The status of the at least a portion of the one or more servers may be updated. The status may be provided in the form of a color-coded server listing.

If the status is a server problem status, at least one corrective action instruction may be provided. The at least one corrective action instruction may be provided in the form of a hover-over message. If the status is a server problem status, the user may be notified. Notifying the user may include providing at least one corrective action instruction.

According to another implementation, a computer program product may reside on a computer readable medium, which may have a plurality of instructions stored thereon. When executed by a processor, the instructions cause the processor to perform operations including analyzing one or more network interactions of a user. The instructions further cause the processor to identify one or more servers associated with the one or more network interaction. The instructions further cause the processor to render a listing of at least a portion of the one or more servers.

One or more of the following features may be included. The one or more network interactions may include one or more of: application usage, database usage, mail server access, and instant messaging server access.

Rendering a listing of at least a portion of the one or more servers may include providing a server group listing in an instant messaging user interface, the server group listing including the at least a portion of the one or more servers. The instructions may further cause the processor to provide an indicator of a status of the at least a portion of the one or more servers. The instructions may further cause the processor to update the status of the at least a portion of the one or more servers. The status may be provided in the form of a color-coded server listing.

If the status is a server problem status, at least one corrective action instruction may be provided. The at least one corrective action instruction may be provided in the form of a hover-over message. If the status is a server problem status, the user may be notified. Notifying the user may include providing at least one corrective action instruction.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
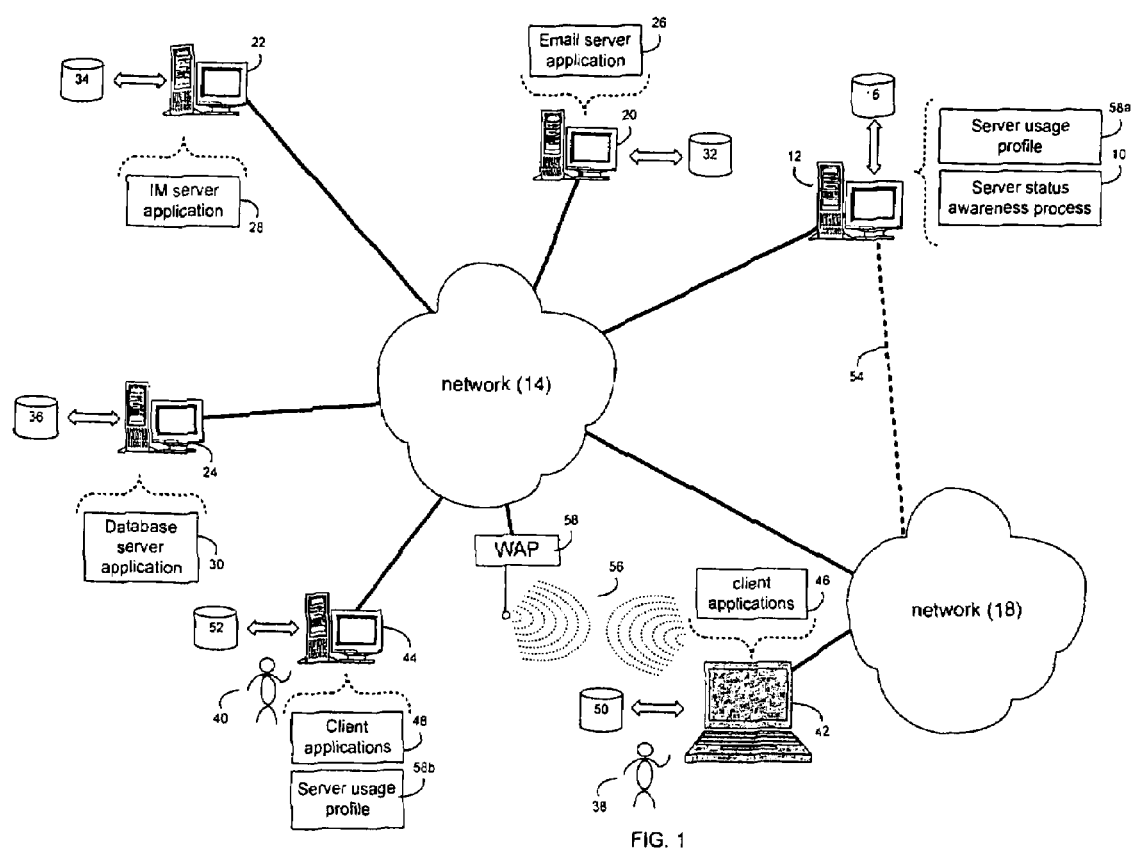
FIG. 1 diagrammatically depicts a server status awareness process coupled to a distributed computing network.

System Overview:

Referring to FIG. 1, there is shown server status awareness process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. In addition/as an alternative, server status awareness process 10 may reside on and may be executed by one or more client electronic devices, such as a personal computer, notebook computer, personal digital assistant, and data enable cellular phone, for example.

As will be discussed below in greater detail, server status awareness process 10 may analyze one or more network interactions of a user. One or more servers associated with the one or more network interaction may be identified and a listing of at least a portion of the one or more servers may be rendered.

The instruction sets and subroutines of server status awareness process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Additional server computers may be connected to network 14, such as email server 20, instant messaging server 22, and database server 24. The instruction sets and subroutines of server applications (e.g., email server application 26, instant messaging server application 28, and database server application 30) which may be stored on storage devices 32, 34, 36 (respectively) coupled to additional server computers 20, 22, 24 (respectively), may be executed by one or more processors (not shown) and one or more memory architectures (not shown) incorporated into additional server computers 20, 22, 24 (respectively). Storage devices 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices.

Users 38, 40 may utilize server status awareness process 10 through the device on which client applications 46, 48 (e.g., email client application, instant messaging client application, database client application) are executed, namely client electronic devices 42, 44 (e.g., personal computers, notebook computers, personal digital assistants, and data enable cellular phones), for example. Client applications may be stored on storage devices 50, 52. Storage devices 50, 52 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Users 38, 40 may utilize server status awareness process 10 directly through network 14 or through secondary network 18. Further, server computer 12 (i.e., the computer that executes server status awareness process 10) may be connected to network 14 through secondary network 18, as illustrated with phantom link line 54.

As mentioned above, the server status awareness process may reside on and may be executed, in whole or in part, by a client electronic device (e.g., client electronic devices 42, 44). As a client-side process, the server status awareness process may be a stand-alone application, may interface with one or more client application (e.g., client applications 46, 48), and/or may be an applet/application that may be executed within a client application (e.g., client applications 46, 48). As such, the server status awareness process may be a client-side process, a server side process, or a hybrid client-side/server-side process.

The various client electronic devices (e.g., client electronic device 42, 44) may be directly or indirectly coupled to network 14 (or network 18). For example, notebook computer 42 is shown wirelessly coupled to network 14 via wireless communication channel 56 established between laptop computer 40 and a wireless access point (i.e., WAP) 58, directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Further, personal computer 44 is shown directly coupled to network 14 via a hardwired network connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 42, 44 may each execute an operating system, examples of which may include but are not limited to Microsoft Windows™, Microsoft Windows CE™, Redhat Linux™, or a custom operating system.

Server Status Awareness Process

Figure 2:
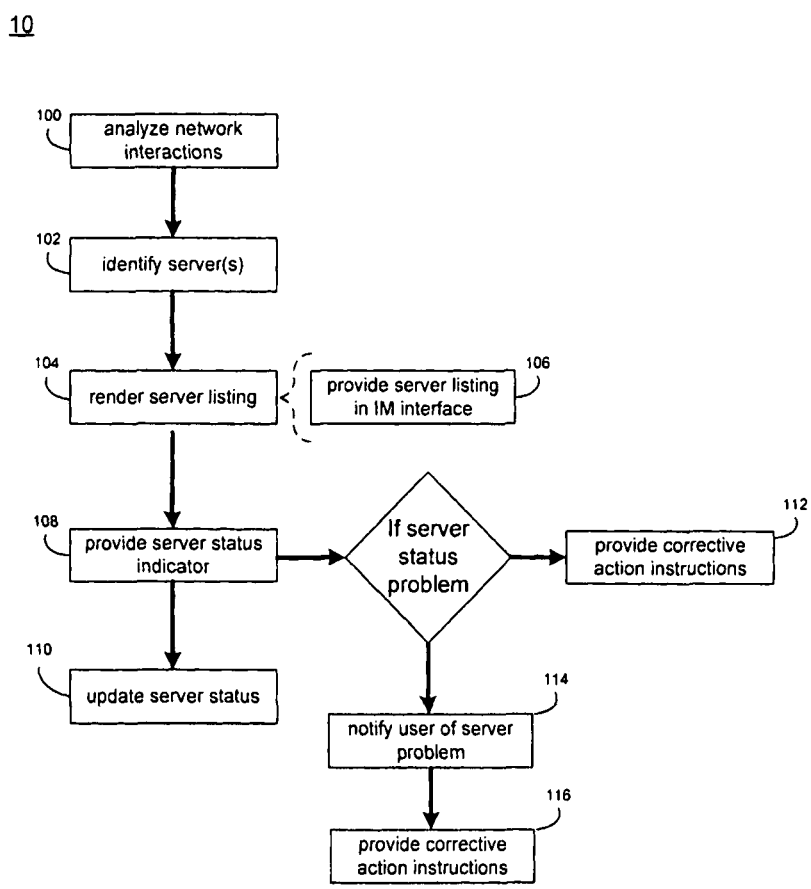
FIG. 2 is a flowchart of a process executed by the server status awareness process of FIG. 1.

Referring also to FIG. 2, server status awareness process 10 may analyze 100 one or more network interactions of a user. Server status awareness process 10 may also identify 102 one or more servers associated with the one or more network interactions of the user. Additionally, server status awareness process 10 may render 104 a listing of at least a portion of the one or more servers.

For example, during the course of a user's daily activities, the user may access various applications in order to work on projects and communicate with co-workers and other contacts. Server status awareness process 10 may track and analyze 100 the user's the users network interactions, e.g., based upon, at least in part, application usage and other access to resources on the network, such as networks 14, 18. The one or more network interactions analyzed 100 by server status awareness process 10 may include application usage, database usage, mail server access, and instant messaging server access.

Server status awareness process 10 may identify 102 one or more servers associated with the one or more network interaction. Continuing with the above stated example, server status awareness process 10 may identify 102, for example, email server 20 accessed by user 40 for sending and receiving email, instant messaging server 22 accessed by user 40 for sending and receiving instant messages, and database server 24 accessed by user 40 for retrieving and/or saving documents. Server status awareness process 10 may also identify 102 any other servers that user 40 may interact with on network 14, 18. In the foregoing manner, server status awareness process 10 may provide an awareness of the servers with which a user interacts.

Server status awareness process 10 may update (e.g., continuously and/or periodically) the servers identified 102 as being accessed and/or interacted with by the user. For example, user 40 may initially have no network interactions (e.g., all usage of client electronic device 44 may involve only local resources). As such, server status awareness process 10 may not identify 102 any servers. User 40 may at some point utilize an email application that may interact with email server 20 over network 14, 18. Server status awareness process 10 may analyze the network interaction with email server 20 and identify email server 20 as a server used by user 40. Server status awareness process 10 may accordingly update (e.g., at the time of interaction or some time thereafter) an awareness of identified 102 server interactions for user 40 to include email server 20. Server interactions for user 40 may be reflected, e.g., in server usage profile 58a, 58b for user 40, which may be stored on client electronic device 44 and/or one or more server (e.g., server computer 12).

Similarly, user 40 may engage in an instant messaging chat with user 38, e.g., utilizing instant messaging server 22 over network 14, 18. Server status awareness process 10 analyze the network interaction (i.e., the instant messaging exchange) and identify 102 instant messaging server 22 as s server accessed/interacted with by user 40. Server status awareness process 10 may, therefore, update (e.g., at the time of interaction, or some time thereafter) an awareness of identified 102 server interactions for user 40 to include instant messaging server 22 (e.g., reflected in server usage profile 58a, 58b).

In a corresponding manner, server status awareness process 10 may update (e.g., periodically, continuously) server usage profile 58a, 58b to remove any servers that have not been associated with a recent network interaction of user 40 (e.g., non-usage). Removing servers not associated with a recent network interaction may occur after a predetermined period of non-usage. The period of non-usage may be set by user 40, by a network administrator, or other user. For example, user 40 may have at some point in time interacted with database server 24. Server status awareness process 10 may have analyzed 100 the network interactions of user 40 and identified 102 database server 24 as a server associated with the network interactions of user 40. User 40 may have subsequently not interacted with database server 24 for the predetermined period of time (e.g., a week, a month, a year, or any other predetermined time period). Server status awareness process 10 may remove database server 24 from server usage profile 58a, 58b associated with user 40 based upon, at least in part, the non-usage of database server 24 for the predetermined period of time. Database server 24 may be re-added to server usage profile 58a, 58b in the event of future interaction with database server 24 by user 40.

As described above, the servers identified 102 by server status awareness process 10 (e.g., and reflected in server usage profile 58a, 58b) may be dependent upon analyzed 100 network interactions of user 40. As such, the servers identified 102 for user 40 (e.g., and reflected in server usage profile 58a, 58b) may be different than the servers identified for another user (e.g., based upon, at least in part, differing network interactions including different servers associated with the differing network interactions).

Server status awareness process 10 may, alone in or conjunction with one or more client applications (e.g., client application 46, 48) render 104 a listing of at least a portion of the one or more servers identified (e.g., email server 20 running email server application 26, instant messaging server 22 running instant messaging server application 28, and database server 24 running database server application 30). For example, the listing may list at least one server which has been utilized by user recently or which user is currently utilizing by, for example, communicating through an instant messaging application. Alternatively, the listing may include at least one server, which user is about to utilize based upon user's current application usage, for example, if user is typing an email for which email server will be utilized when user is ready to send the email. Such listing may be rendered 104 by server status awareness process 10 in a stand-alone interface (not shown) or via an interface provided by, or conjunction with, an existing application accessed by user.

Figure 3:
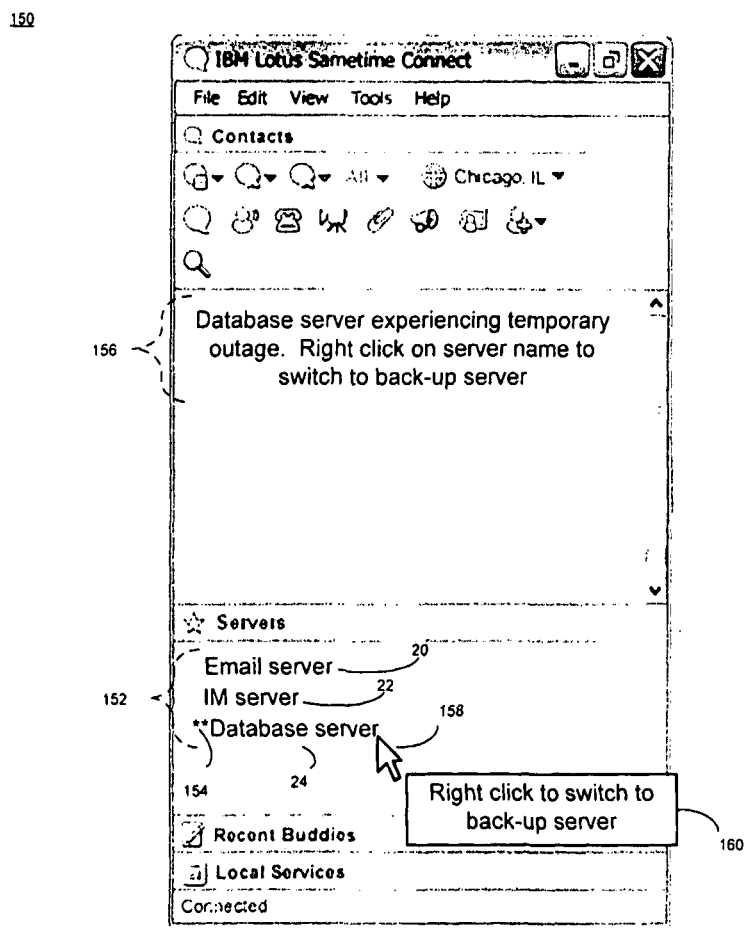
FIG. 3 is a diagrammatic view of a user interface rendered by the server status awareness process of FIG. 1.

For example, and referring also to FIG. 3, server status awareness process 10 and/or an instant messaging application (e.g., client application 48), may render instant messaging interface 150. Additionally, server status awareness process 10 and/or the instant messaging application may render 104 a listing of servers (e.g., that may be interacted with by user 40 via network 14, 18) that may include providing 106 a server group listing 152 in instant messaging user interface 150. The server group listing 152 may include a listing of at least a portion of the one or more servers (e.g., email server 20, instant messaging server 22, and database server 24) interacted with by user 40. For example, just as an instant messaging client application may provide a listing of frequent contacts in an instant messaging user interface, a server group listing 152 may be provided in instant messaging user interface 150.

Server status awareness process 10 may provide 108 an indicator of a status of at least a portion of the one or more servers. For example, server status awareness process 10 may provide 108 an indication of whether the server is functioning normally, experiencing a temporary outage, experiencing heavy traffic and functioning slowly, under maintenance or any other status that may be relevant to the specific server. Continuing with the above stated example, server status process 10 and/or instant messaging client application may provide a graphical indicator 154 (e.g., a double asterisks indicating a status alert) for database server 24 in instant messaging user interface 150. Various other indicators may be used to indicate server status, including graphical and text based indicators.

Server status awareness process 10 may update 110 the status of the one or more servers (e.g., identified in server group listing 152). For example, server status awareness process 10 may evaluate the status of the various servers (e.g., email server 20, instant messaging server 22, database server 24) whenever user 40 engages in an activity that may utilize one or more of the servers (e.g., may attempt to send/receive email, attempt to send/receive instant messages, or attempt to open a database document). Additionally/alternatively, server status awareness process 10 may evaluate the status of the one or more servers on a periodic basis (e.g., at a predetermined time interval). Various additional/alternative arrangements for updating 110 server status may be used.

The status of the server may be determined based upon, at least in part, either a pull or a push modality. For example, in a pull modality, server status awareness process 10 may periodically (e.g., at predetermined time intervals, in response to a user request for server status, or the like) make a request to one or more of the servers identified 102 for the server to provide an update of the status of the server. The server status may be known based upon a response received from the server and/or an absence of response from the server (e.g., indicating an unavailability or problem with the server). Additionally/alternatively, in a push modality, one or more of the servers identified 102 by server status awareness process 10 may periodically (e.g., at a predetermined interval) send a server status update to server awareness process 10 and or to a client application rendering a 104 the listing of servers.

Continuing with the above-stated example, if database server 24 is experiencing a temporary outage (as noted by graphical indicator 154), server status awareness process 10 may periodically poll database server 24 to evaluate the current status of database server 24. Server status awareness process 10 may update 110 the status of database server 24 in the server group listing 152 to provide a server status reflecting any change in the status of database server 24 (e.g., to provide 108 a current status of database server 24).

The status may be provided 108 in the form of visual indicators, such as a color-coded server listing, an icon based indicator (e.g., graphical indicator 154), and the like. For example, a healthy server may be listed in green print. A server experiencing heavy traffic may be listed in yellow print, to indicate that the server is working, but working slowly. A server that is experiencing an outage or that is under maintenance may be listed in red, reflecting that the server is unavailable for use. Other colors, icons, and/or graphical or visual features may be used to indicate different statuses.

If the status is a server problem status, server status awareness process 10 may provide 112 at least one corrective action instruction 156. For example, an alternative server may be available for user to utilize in the event of a server outage, but the user may not know which server to use or how to access that server. Continuing with the above-stated example, corrective action instruction 156 be provided 112, e.g., in instant messaging user interface 150. The corrective action instruction may, for example, provide a link for user to utilize that will reconfigure user's server routing. Alternatively, corrective action instruction 156 may include steps user may take to reconfigure the server routing (e.g., "right click to switch to back-up server").

In addition/as an alternative to providing 112 a corrective action instruction 156 in instant messaging user interface 150, server status awareness process 10 may provide 112 the at least one corrective action instruction in the form of a hover-over message. For example, when a user moves onscreen pointer 158 (controlled by a pointing device, such as a mouse; not shown) over the problem server (e.g., database server 24) in server group listing 152, a text box 160 may be rendered by server status awareness process 10 and/or instant messaging client application. Text box 160 may provide 112, e.g., corrective action instruction for user 40 to reconfigure the server routing (e.g., "right click to switch to back-up server").

If the status is a server problem status, server status awareness process 10 may notify 114 the user of the server problem status. For example, as discussed above, server status awareness process 10 and/or instant messaging user interface may provide graphical indicator 154 of the server status and/or may provide 112 corrective action 156, that may include the server problem status. Additionally/alternatively, server status awareness process 10 notify 114 the user of the server problem status, e.g., using a pop-up message or to bring the server status interface (e.g., instant messaging user interface 150 including server group listing 152 and graphical indicators 154) to the top window when server status awareness process 10 has detected a server problem. Additionally, server status awareness process 10 may, for example, send user 40 an instant message, email, text message, or other notice to notify 114 user 40 of the server problem status.

When notifying 114 the user of a server problem status, server status awareness process 10 may provide 116 at least one corrective action instruction. For example, instant messaging user interface 150 (including server group listing 152) is brought to the top window, corrective action instruction 156 may be included in instant messaging user interface 150.

Though server status awareness process 10 has been described as providing corrective action instructions for a user to utilize, server status awareness process 10 may reconfigure a user's server routing when a server problem is detected without troubling the user. That is, server status awareness process may take the necessary corrective actions to remedy the server problem status without requiring user input or action.

Providing 108 a server status indicator and providing 116 at least one corrective action instruction may be based upon, at least in part, user configuration settings. For example, the type and amount of information provided may include high level status information (e.g., available, unavailable) and general troubleshooting/corrective action information (e.g., fail over to alternative server). Additionally, the type and amount of information may include more detailed status and trouble shooting/corrective action information (e.g., recent log postings, server CPU statistics, and so forth). User configuration settings may be applied by the user, may be set system wide, and/or may be set by a third party for individual users. For example, user configuration setting for a conventional user may be set such that server status awareness process 10 may only provide high level status and trouble shooting information, while user configuration settings for an administrative user may provide more detailed status and trouble shooting information.

A number of implementations have been described. Nevertheless, it will be understood that various modifications may be made. Accordingly, other implementations are within the scope of the following claims.

What is claimed is:

1. A computer implemented method comprising:
analyzing, using a server status process executing on a client electronic device via one or more computing devices, one or more network interactions of a user, wherein the server status process is interfaced with one or more client applications;
identifying, via the one or more computing devices, one or more servers associated with the one or more network interactions, including anticipating at least one server the user will utilize and is not currently utilizing based upon, at least in part, current application usage of the user in a usage profile;
rendering, via the one or more computing devices, a listing of at least a portion of the one or more servers in an instant messaging user interface;
evaluating the one or more servers identified as being interacted by the user, via the one or more computing devices, for a status of the one or more servers on a periodic basis;
providing, via the one or more computing devices, an indicator of the status of the at least a portion of the one or more servers via the instant messaging user interface;
providing, with the indicator of the status, at least one corrective action instruction via the instant messaging user interface that is selectable by the user when the status is a server problem status;
updating by storing a recent one or more network interactions in the usage profile, via the one or more computing devices, the status of the at least a portion of the one or more servers, wherein the one or more servers reflected in the usage profile for one user are different than the one or more servers identified for another user in accordance with respective network interactions;
removing in the usage profile, via the one or more computing devices, at least one server from the listing of at least a portion of the one or more servers when the at least one server has not been associated with the recent one or more network interactions of the user after a predetermined period of non-usage of current application; and
wherein the status is provided in the form of visual indicators including a color-coded server listing in the instant messaging user interface.

2. The method of claim 1, wherein the one or more network interactions include one or more of: application usage, database usage, mail server access, and instant messaging server access.

3. The method of claim 1, wherein the color coded server listing includes a green color to show a healthy server, a yellow color for a server that is working slowly due to experiencing heavy traffic, and a red color for a server that is experiencing an outage or that is under maintenance, reflecting that the server is unavailable for use.

4. The method of claim 1, wherein the at least one corrective action instruction is provided in the form of a hover-over message.

5. A computer program product residing on a non-transitory computer readable medium having a plurality of instructions stored thereon which, when executed by a processor, cause the processor to perform operations comprising:
analyzing, using a server status process executing on a client electronic device, one or more network interactions of a user, wherein the server status process is interfaced with one or more client applications;
identifying one or more servers associated with the one or more network interactions, including anticipating at least one server the user will utilize and is not currently utilizing based upon, at least in part, current application usage of the user in a usage profile;

rendering a listing of at least a portion of the one or more servers in an instant messaging user interface;

evaluating the one or more servers identified as being interacted by the user for a status of the one or more servers on a periodic basis;

providing an indicator of the status of the at least a portion of the one or more servers via the instant messaging user interface;

providing, with the indicator of the status, at least one corrective action instruction via the instant messaging user interface that is selectable by the user when the status is a server problem status;

updating by storing a recent one or more network interactions in the usage profile, the status of the at least a portion of the one or more servers wherein the one or more servers reflected in the usage profile for one user are different than the one or more servers identified for another user in accordance with respective network interactions;

removing in the usage profile at least one server from the listing of at least a portion of the one or more servers when the at least one server has not been associated with the recent one or more network interactions of the user after a predetermined period of non-usage of current application; and wherein the status is provided in the form of visual indicators including a color-coded server listing in the instant messaging user interface.

6. The computer program product of claim 5, wherein the one or more network interactions include one or more of: application usage, database usage, mail server access, and instant messaging server access.

7. The computer program product of claim 5, wherein the color coded server listing includes a green color to show a healthy server, a yellow color for a server that is working slowly due to experiencing heavy traffic, and a red color for a server that is experiencing an outage or that is under maintenance, reflecting that the server is unavailable for use.

8. The computer program product of claim 5, wherein the at least one corrective action instruction is provided in the form of a hover-over message.

* * * * *